United States Patent
Wawrzola et al.

(10) Patent No.: US 11,499,673 B2
(45) Date of Patent: Nov. 15, 2022

(54) AUTOMATIC LUBRICATOR FOR LUBRICATING AN OBJECT

(71) Applicant: Dodge Industrial, Inc., Oxford, CT (US)

(72) Inventors: Grzegorz Wawrzola, Kielce (PL); Daniel Lewandowski, Cracow (PL); Eric Lambert, Central, SC (US); Greg Hewitt, Taylors, SC (US); Artur Rdzanek, Simpsonville, SC (US)

(73) Assignee: Dodge Industrial, Inc., Oxford, CT (US)

( * ) Notice: Subject to any disclaimer, the term of this patent is extended or adjusted under 35 U.S.C. 154(b) by 347 days.

(21) Appl. No.: 16/593,706

(22) Filed: Oct. 4, 2019

(65) Prior Publication Data

US 2021/0102663 A1   Apr. 8, 2021

(51) Int. Cl.
*F16N 7/00*   (2006.01)
*F16N 29/04*   (2006.01)
*F16N 29/02*   (2006.01)

(52) U.S. Cl.
CPC .............. *F16N 7/00* (2013.01); *F16N 29/02* (2013.01); *F16N 29/04* (2013.01);
(Continued)

(58) Field of Classification Search
CPC . F16N 7/00; F16N 29/02; F16N 29/04; F16N 2230/02; F16N 2230/10
See application file for complete search history.

(56) References Cited

U.S. PATENT DOCUMENTS 3,165,171 A * 1/1965 Baeriswyl ............... F16N 29/02
  184/3.2
5,634,531 A * 6/1997 Graf ........................ F16N 11/08
  184/37
(Continued)

OTHER PUBLICATIONS

International Searching Authority / US, International Search Report & Written Opinion issued in corresponding Application No. PCT/US2020/053960, dated Dec. 22, 2020, 11 pp.

*Primary Examiner* — Michael R Mansen
*Assistant Examiner* — Mark K Buse
(74) *Attorney, Agent, or Firm* — Robinson & Cole LLP

(57) ABSTRACT

An automatic lubricator for lubricating an object is described, which comprises a housing with a coupling section configured to couple with a lubricant container containing a lubricant, wherein the lubricant container comprises a rotatable shaft with a piston to dispense the lubricant from an output of the lubricant container. The lubricator further comprises an electric motor configured to drive the rotatable shaft of the lubricant container during at least one lubrication action, such that at least a part of the lubricant is dispensable from the lubricant container during the at least one lubrication action, and a power supply configured to supply the electric motor with a supply current during the at least one lubrication action. The lubricator further comprises a control circuitry configured to acquire a current signal indicative of the supply current over time during at least a part of the at least one lubrication action, determine a periodicity of the acquired current signal, and determine, based on the determined periodicity, at least one lubrication parameter indicative of the at least one lubrication action.

28 Claims, 4 Drawing Sheets

(52) U.S. Cl.
CPC ...... *F16N 2230/02* (2013.01); *F16N 2230/10* (2013.01); *F16N 2270/70* (2013.01)

(56) References Cited

U.S. PATENT DOCUMENTS

| | | | | |
|---|---|---|---|---|
| 6,125,969 | A * | 10/2000 | Graf | F16N 11/08 |
| | | | | 184/105.1 |
| 6,182,793 | B1 * | 2/2001 | Jamison | B61K 3/02 |
| | | | | 184/3.2 |
| 6,216,822 | B1 | 4/2001 | May et al. | |
| 8,479,886 | B2 * | 7/2013 | Tokuyama | G01F 23/22 |
| | | | | 184/6.4 |
| 9,388,940 | B2 * | 7/2016 | Conley | F16N 7/38 |
| 2002/0048517 | A1 * | 4/2002 | Sugita | F16N 7/38 |
| | | | | 417/12 |
| 2004/0065511 | A1 * | 4/2004 | Javelly | B65G 45/02 |
| | | | | 184/15.2 |
| 2004/0099483 | A1 | 5/2004 | Song | |
| 2016/0290558 | A1 | 10/2016 | Kuijpers et al. | |
| 2019/0156600 | A1 * | 5/2019 | Potyrailo | B61C 17/08 |
| 2021/0102664 | A1 * | 4/2021 | Wawrzola | F01M 11/10 |
| 2021/0199240 | A1 * | 7/2021 | Wawrzola | F16N 7/14 |
| 2021/0199241 | A1 * | 7/2021 | Wawrzola | F16N 11/08 |
| 2021/0199242 | A1 * | 7/2021 | Wawrzola | F16N 11/08 |
| 2021/0310612 | A1 * | 10/2021 | Kreutzkaemper | F16N 7/00 |

\* cited by examiner

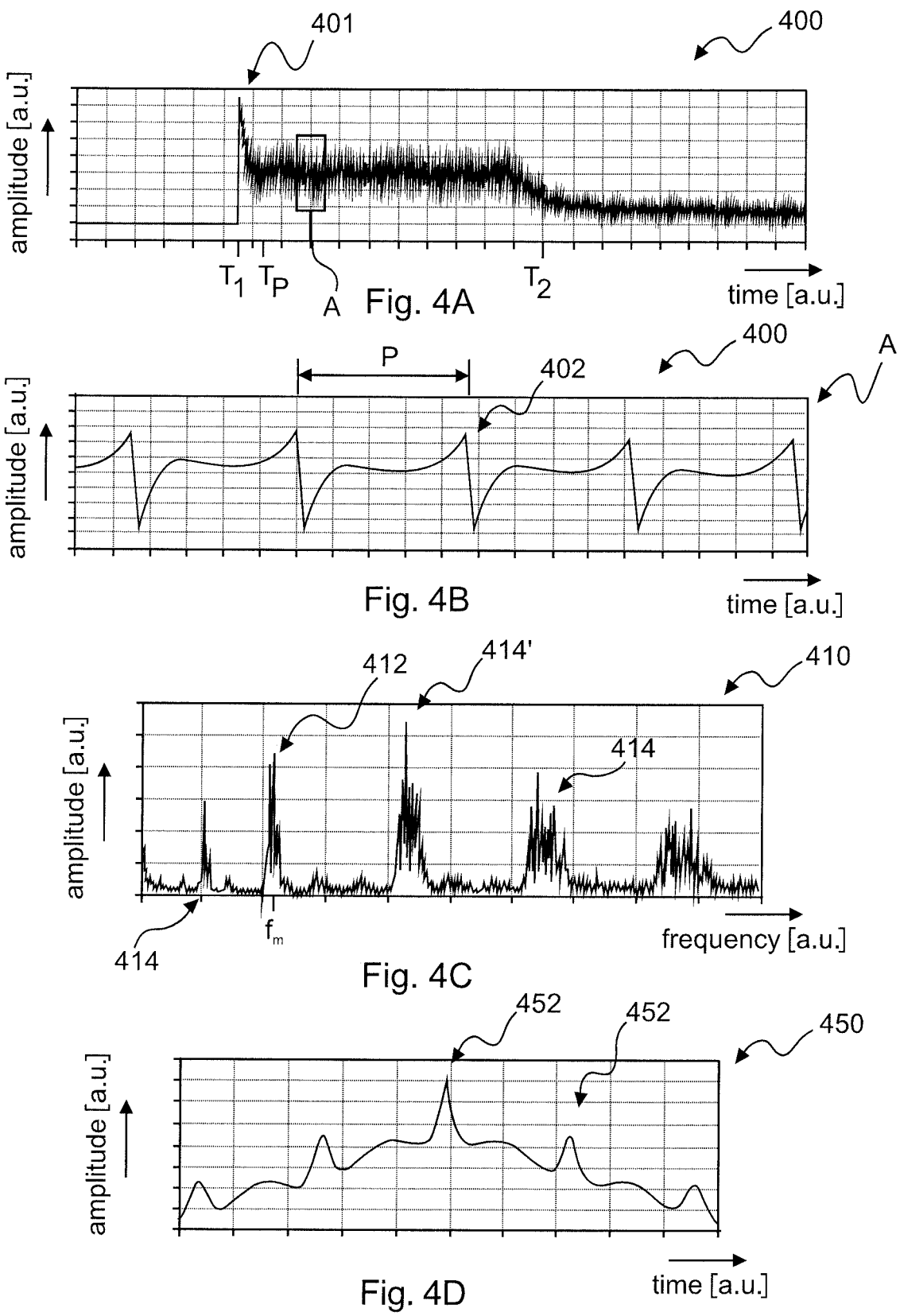

AUTOMATIC LUBRICATOR FOR LUBRICATING AN OBJECT

TECHNICAL FIELD

The present invention relates to an automatic lubricator and/or lubrication device for lubricating an object. The invention further relates to a lubrication system comprising such lubricator, a method of lubricating an object, a computer program, and a non-transitory computer-readable medium storing such computer program.

TECHNICAL BACKGROUND

Automatic lubricators, lubrication devices and/or lubrication systems are usually used for ensuring a smooth and reliable operation of an apparatus, engine, device and/or industrial system by lubricating one or more objects, parts, portions and/or members thereof. Such objects, parts, portions and/or members can, for example, be and/or comprise a bearing, a shaft or the like.

Generally, an automatic lubricator can automatically apply lubricant onto and/or into the object that should be lubricated at a specified lubrication time, with a certain lubrication frequency and/or in certain lubrication time intervals. This can render a manual application of the lubricant unnecessary and hence allow to reduce maintenance effort and costs. Therein, a selection of an appropriate lubricant and/or time of lubrication can prevent a failure of the object, the apparatus, engine, device and/or the industrial system, thereby allowing to extend the lifetime thereof.

SUMMARY

According to the present disclosure, there is provided an improved lubricator that provides improved and/or enhanced functionality, e.g. in terms of reliably, quickly, efficiently and/or accurately determining one or more lubrication parameters.

This is achieved by the subject matter of the independent claims, wherein further embodiments are incorporated in the dependent claims, the following description and the appended figures.

According to a first aspect of the present disclosure, an automatic and/or at least partly automated lubricator configured to lubricate an object is provided. Generally, the lubricator may refer to a lubrication device configured to apply lubricant onto and/or into at least a part of the object. The lubricator comprises a housing with a coupling section and/or coupling portion configured to couple with a lubricant container for containing and/or containing a lubricant. The lubricant container comprises a rotatable shaft with a piston arranged thereon to dispense the lubricant from an output and/or outlet of the lubricant container. The lubricator further comprises an electric motor configured to drive the rotatable shaft of the lubricant container and/or to displace the piston during at least one lubrication action, such that at least a part of the lubricant is dispensable, can be dispensed and/or is dispensed from the lubricant container, e.g. from an outlet and/or output of the container, during the at least one lubrication action. The lubricator further comprises a power supply configured to supply the electric motor with a supply current during the at least one lubrication action, and a control circuitry for actuating and/or controlling the electric motor and/or the power supply. Therein, the control circuitry is configured to acquire, determine, and/or monitor a current signal indicative of the supply current over time during at least a part of the at least one lubrication action and to determine a periodicity of the acquired current signal. The control circuitry is further configured to determine, based on the determined periodicity and/or based on analyzing the determined periodicity, at least one lubrication parameter indicative of the at least one lubrication action.

As will be further discussed in the following, determining the periodicity and/or analyzing the periodicity of the acquired, determined and/or monitored current signal during at least a part of the lubrication action can advantageously allow for a reliable, accurate and efficient determination of one or more lubrication parameters. Further, determining the periodicity and/or analyzing the periodicity of the acquired current signal may not require substantial modifications to existing lubricators, such as e.g. one or more dedicated sensors for determining the one or more lubrication parameters. In turn, this may allow manufacturing the lubricator in a cost-efficient manner.

Here and in the following, the "object" can refer to any part, portion and/or member that should be lubricated. For instance, the object can refer to a movable part of an apparatus, device, system and/or industrial system, such as e.g. a motor, an engine or the like. Such a movable part can, for example, be a bearing, a shaft, a drive shaft or the like.

The coupling section of the housing can be configured for being coupled to the lubricant container or at least a part thereof. For instance, the coupling section of the housing can be configured for being detachably attached and/or mechanically coupled to the lubricant container. Alternatively or additionally, the coupling section can be configured for engaging with at least a part of the lubricant container. The lubricant container and the coupling section may, for instance, be coupled via a threaded coupling or any other suitable coupling allowing to attach and/or detach the container to the housing.

The lubricant container can refer to any type of container, cartridge, can and/or tank configured to store and/or contain a lubricant. The rotatable shaft of the container can, for example, refer to a rotatable screw. The piston of the container can be displaceably arranged on, attached to and/or mounted to the rotatable shaft of the lubricant container. By rotation of the rotatable shaft, the piston can be moved and/or displaced along the rotatable shaft, e.g. in direction towards the output and/or outlet of the container, such that lubricant can at least partly be pushed and/or moved by the piston out of the output of the container to lubricate the object.

The electric motor can be an arbitrary type of electric motor, such as e.g. a DC motor, an AC motor, a brushed motor or a brushless motor. The electric motor is supplied with electrical power by a power supply of the lubricator. The power supply can be connected to a supply grid or it can comprise one or more batteries and/or accumulators.

In the context of the present disclosure the term "lubrication action" may refer to a state of the lubricator, in which the electric motor is actuated by the control circuitry, supplied with electrical power, powered and/or driven by electrical power. Accordingly, the lubrication action may refer to and/or be indicative of a time period and/or a lubrication time period, during which the electric motor is actuated by the control circuitry, supplied with electrical power, powered and/or driven with electrical power by the control circuitry (and/or the power supply). During the lubrication action, a certain amount of lubricant may be dispensed by the lubricator. Depending on a condition or state of the lubricant container, such as e.g. a blockage of the output, however, dispensing of lubricant may be blocked, although the electric motor is actuated and/or powered. Accordingly, the term "lubrication action" can be accompanied by and/or result in dispensing a certain amount of lubricant or it can be accompanied by and/or result in powering the electric motor without dispensing lubricant, e.g. in the case of a blockage of the output. Both scenarios are referred to as lubrication action in the present disclosure. In other words, a lubrication action may comprise dispensing of lubricant and may comprise a lubrication attempt, during which the electric motor is actuated, but no lubricant can be dispensed, e.g. because of an output blockage, because the lubricant container is empty, because of a malfunction of the container, because of an erroneous coupling of the container to the lubricator, because no lubricant container is coupled to the lubricator or the like. Further, the "at least part" of the lubrication action may refer to a partial or the entire time period of the lubrication action (and/or lubrication time period).

The control circuitry may refer to a control circuit, a controller and/or a control unit configured to actuate and/or control the electric motor. The control circuitry may be coupled to the electric motor by one or more electric lines. The control circuitry may be configured to switch-on the electric motor, e.g. thereby initiating the at least one lubrication action. For instance, the control circuitry may switch-on the electric motor by activating the power supply for supplying electrical power to the electric motor and/or by coupling the electric motor to the power supply, e.g. based on actuating a switch arranged in a supply line connecting the power supply and the electric motor. Further, the control circuitry may be configured to switch-off the electric motor, e.g. to terminate the at least one lubrication. The electric motor may be switched-off by the control circuitry e.g. by deactivating the power supply and/or by decoupling the electric motor from the power supply.

Further, the lubricator can comprise a data storage and/or data storage device. The data storage may be part of and/or may be coupled to the control circuitry. The control circuitry may further comprise one or more processors, e.g. one or more microcontrollers or the like. The data storage may store software instructions and/or a computer program, which, when executed by the one or more processors of the control circuitry instructs the lubricator to perform the functional features and/or functionalities described above and in the following with reference to the lubricator, such as e.g. the acquisition of the current signal, the determination of the periodicity and/or the determination of the at least one lubrication parameter.

In the context of the present disclosure, the at least one lubrication parameter is indicative of, representative of and/or descriptive of the at least one lubrication action. Therein, the at least one lubrication parameter may, generally, refer to an operational parameter or parameter descriptive, representative, and/or indicative of an operation of the lubricator and/or an operation of at least a part of the lubricator, such as e.g. the electric motor. Alternatively or additionally, the at least one lubrication parameter may be descriptive, representative, and/or indicative of a status, a state, a condition and/or a working condition of the lubricator and/or at least a part thereof, such as e.g. an idle state, a running state, a normal working condition, a malfunction and/or an abnormal working condition. Alternatively or additionally, the at least one lubrication parameter may refer to an operational parameter descriptive, representative, and/or indicative of an operation of the container and/or an operation of at least a part of the container, such as e.g. a rotation of the rotatable shaft, a movement of the rotatable shaft, a displacement of the piston and/or a movement of the piston. Moreover, the at least one lubrication parameter may be indicative of, descriptive of and/or representative of a state, a status and/or a condition of the lubricant container, such as e.g. an amount of lubricant contained and/or remaining in the container. These aspects will be further elucidated hereinbelow.

In the context of the present disclosure, the current signal may refer to and/or may be stored as current data, e.g. in the data storage, indicative of the supply current over time during at least a part of the at least one lubrication action. The control circuitry may, for example, sample the supply current to determine the current signal and/or the current data during at least a part of the lubrication action. This can allow for a detailed and comprehensive analysis of the acquired current signal and/or the current data.

During operation of a lubricator, the lubricator and/or the electric motor thereof is usually supplied with electrical power in certain lubrication time intervals, with a certain lubrication frequency or rate and/or for a certain lubrication time period per lubrication action in order to perform one or more lubrication actions. When the electric motor is supplied with electrical power to initiate a lubrication action under normal working condition, usually a peak occurs in the current signal over time, which rapidly drops when the electric motor starts rotating due to a back electromotive force generated by the spinning electric motor. Under normal condition, the current signal then usually fluctuates about a mean value for the remaining lubrication action and/or the remaining lubrication time period. Due to the electric motor's rotation, however, the current signal is modulated with a certain periodicity, which is indicative of, representative of, related to and/or correlates with a rotation and/or rotational speed of the electric motor. Accordingly, the "periodicity" may refer to a period of a modulation of the current signal and/or the supply current, e.g. a periodic and/or quasi-periodic modulation, during at least a part of the lubrication action. The "at least part of the lubrication action" may for instance refer to the part of the lubrication action and/or the corresponding current signal after the peak that occurs when the lubrication action is started. Therein, the period and/or periodicity may be given as the inverse of a frequency of the (periodic and/or quasi-periodic) modulation of current signal and/or the supply current during at least a part of the lubrication action.

For example, if the electric motor is a brushed motor, current pulses are expected in the current signal if one of the brushes passes a winding of the electric motor. Further, depending e.g. on the load of the electric motor, a force and/or pressure exerted by the electric motor onto the shaft, the modulation and/or the periodicity of the current signal changes. Hence, the periodicity and/or modulation of the current signal during at least a part of the lubrication action, e.g. after the peak occurring when the lubrication action is started, allows to derive comprehensive information about the electric motor's operation which in turn allows to derive comprehensive information about the lubricator, an operation of the lubricator, the container and/or an operation of the container. In other words, determining the periodicity and/or analysis thereof allows for a reliable, accurate and efficient determination of one or more lubrication parameters.

It should be noted, however, that in some working conditions of the lubricator and/or the container, such as for example an error condition and/or malfunction, the current signal may not be modulated and/or may not comprise a periodic and/or quasi-periodic component. Such scenarios are also covered by determining the periodicity of the current signal in the context of the present disclosure.

Accordingly, the term "determining the periodicity of the current signal" may refer to analyzing the current signal in terms of a periodicity, in terms of a presence of a periodicity and/or in terms of an absence of a periodicity. In other words, determining the periodicity may comprise determining a value of the periodicity, determining whether the current signal comprises a periodic (and/or quasi-periodic) modulation and/or whether the current signal lacks a periodic (and/or quasi-periodic) modulation. Accordingly, the at least one lubrication parameter, such as e.g. an abnormal working condition, an error and/or a malfunction, may be determined by the control circuitry based on determining that the current signal lacks a periodic and/or quasi-periodic modulation.

Further, it should be noted that in context of the present disclosure the periodicity of the current signal can refer to a periodicity of the current signal during a single lubrication action. For instance, if the current signal covers a plurality of lubrication actions, also the lubrication actions may result in current pulses occurring with a certain frequency and/or periodicity. This periodicity, however, merely refers to the number of lubrication actions performed during a certain time interval. In contrast thereto, the present disclosure may be focused on determining the periodicity of the current signal during a single lubrication action. This, however, does not exclude that the periodicity is determined for each of a plurality of lubrication actions separately. In other words, the control circuitry can be configured to determine the periodicity of the current signal during a single lubrication action and/or for each lubrication action of a plurality of lubrications separately.

The present disclosure may be considered as being at least partly based on the following insights and findings. Generally, it may be desirable to increase an efficiency and reliability of industrial systems, devices and/or apparatuses. For this purpose, it may be desirable to determine, detect and/or monitor one or more lubrication parameters by means of an automatic lubricator, which in turn may provide, for example, an indication about whether the object to be lubricated is indeed reliably and sufficiently lubricated. Accordingly, offering an enhanced functionality of a lubricator may be desirable in the field of industrial systems and/or in industry. For example, it can be beneficial to detect an abnormal work condition (or working condition), an error, a failure, and/or a malfunction of the lubricator and/or the container, which can allow for a fast reaction to re-establish proper or normal operation of the lubricator and/or the container as soon as possible, such that a possibility or risk of damaging the object to be lubricated, e.g. due to a lack of proper lubrication, can be minimized.

According to the present disclosure, one or more lubrication parameters can be determined and/or detected based on determining, detecting, and/or analyzing the periodicity of the current signal. In turn, this can allow for an efficient, fast, cost-efficient, reliable and/or accurate determination of the one or more lubrication parameters, in particular without requiring additional sensors for detecting the one or more lubrication parameters. Moreover, the functionality of the lubricator allowing to determine the periodicity of the current signal and the at least one lubrication parameter can be built and/or integrated into the lubricator, e.g. into the housing of the lubricator. This can, for example, allow to use different types and/or sizes of containers with the same lubricator, particularly without requiring any modification to the container. In other words, as the functionality allowing to determine the periodicity and the lubrication parameter(s) may not be connected with the container itself, the lubricator can be used an arbitrary number of times, even when the lubricant container has been replaced and/or the container size has been changed. Also, maintenance efforts and costs, e.g. for replacing the containers, can be significantly reduced as no extra action, e.g. related to fixing a dedicated sensor to the lubricant container, may be required.

In other words, a reliable detection of the lubrication parameter(s) that is independent on environmental conditions, such as e.g. vibration, moisture and/or temperature at the site of the lubricator, can be ensured by the lubricator according to the present disclosure. Also, the cost of determining the lubrication parameter(s) as well as costs involved with replacement of the container can be minimized, since, for example, no additional time-consuming action like manual fixing of a dedicated sensor to the lubricant container may be required. Also, the invention can be used to advantage with different types of containers, independent on their dimensions and length.

According to an embodiment, the at least one lubrication parameter is indicative of at least one of an abnormal working condition of the lubricator; an abnormal working condition of the lubricant container; a blockage of the output of the lubricant container; a malfunction of the electric motor; a malfunction of the power supply; an amount of lubricant dispensed during at least a part of the at least one lubrication action; an accumulated amount of lubricant dispensed from the lubricant container in a plurality of lubrication actions; an amount of lubricant remaining in the lubricant container; a force exerted by the electric motor onto the rotatable shaft of the container during at least a part of the at least one lubrication action; a load of the electric motor during at least a part of the lubrication action; a lubrication time period for the at least one lubrication action; a lubrication frequency; and a time between consecutive lubrication actions. Accordingly, based on the determined periodicity of the current signal one or more lubrication parameters providing information about the lubrication action and/or the condition of the lubricator and/or the condition of the container can be determined. Therein, one lubrication parameter can be derived from another lubrication parameter. For instance, the amount of lubricant dispensed during the at least one lubrication action actually performed can be determined and added to an amount of lubricant dispensed during one or more previous lubrication actions in order to determine the accumulated amount of lubricant. This can allow to derive comprehensive information about the lubrication action, the lubricator and/or the container based on determining and/or analyzing the periodicity of the current signal.

Therein, the abnormal working condition of the container and/or the lubricator may refer to a working condition, in which an actual amount of lubricant dispensed during the lubrication action differs from a pre-defined and/or target amount of lubricant, e.g. an amount that should be dispensed during the lubrication action. This can comprise dispensing more lubricant as well as less lubricant than the pre-defined amount of lubricant. For instance, the output and/or outlet of the container may be completely or partially blocked resulting in a reduction of the actual amount of lubricant dispensed during the lubrication action.

Further, the blockage of the output determined based on the periodicity may refer to a partial blockage or a complete blockage of the output. The lubrication time period may refer to and/or denote the time period of the lubrication action, i.e. the time during which the electric motor is actuated by the control circuitry, is switched-on, powered, driven and/or supplied with electric power by the control circuitry (and/or the power supply). The lubrication time period may be given as the time difference between a termination time of the lubrication action, at which the lubrication action is terminated, and a start time of the lubrication action, at which the lubrication action was started or initiated.

It should be noted that the present disclosure is not limited to the lubrication parameters listed above. Rather, any other lubrication parameter that is determinable based on the determined periodicity can alternatively or additionally be determined. For instance, a normal working condition, such as e.g. a condition in which the actual amount of lubricant dispensed matches the pre-defined and/or target amount, can be determined. Alternatively or additionally one or more of a start time of a subsequent lubrication action, a pressure exerted by the electric motor onto the shaft, a pressure exerted by the piston onto the lubricant, a force exerted by the piston onto the lubricant, a viscosity of the lubricant, and a torque exerted by the electric motor can be determined based on the determined periodicity.

According to an embodiment, the control circuitry is configured to determine the periodicity of the current signal based on determining at least one of a Fourier transform, an autocorrelation function of the current signal and an autocovariance of the current signal.

In the context of the present disclosure, the term autocorrelation (and/or autocorrelation function) may be used synonymously to the term autocovariance. It is noteworthy, however, that mathematically the autocorrelation function may be defined as the normalized autocovariance. The normalization, however, may be disregarded. Accordingly, it should be noted that in the context of the present disclosure, the term autocorrelation (and/or autocorrelation function) also covers the autocovariance of the current signal. In other words, any disclosure presented hereinabove and hereinafter with respect to the autocorrelation and/or the autocorrelation function of the current signal equally applies to the autocovariance and/or any other mathematical representation of the current signal correlating with the autocorrelation and/or autocorrelation function.

Based on the Fourier transform of the current signal, the periodicity and/or period can be determined in the frequency domain, e.g. based on determining and/or identifying the frequency of the Fourier transform having the largest amplitude among the frequencies of the Fourier transform and/or among the frequencies of a predefined and/or selected range of frequencies in the Fourier transform. The periodicity of the current signal may then be calculated as the inverse of the identified frequency having the largest amplitude in the Fourier transform (and/or the Fourier spectrum).

Further, based on the autocorrelation function and/or autocovariance of the current signal the period and/or periodicity of the current signal can be calculated, e.g. based on the fact that the value of the autocorrelation function (and/or autocovariance) for a delay t equal to the periodicity P is equal to the value for delay zero ($R(t=P)=R(t=0)=1$, with R being the autocorrelation function). Accordingly, the autocorrelation function and/or autocovariance allows to determine the period and/or periodicity of the current signal in the time domain. Further, the frequency of the current signal can then be calculated as the inverse of the periodicity.

As the inverse Fourier transform of the power spectral density of the current signal is the autocorrelation function, determining the periodicity based on the Fourier transform, based on the autocorrelation function and based on the autocovariance are equivalent. In either approach, the periodicity can be determined with high accuracy and precision, thereby allowing to reliably and accurately determine the at least one lubrication parameter. Therein, the power spectral density can be computed based on the squared magnitude of the Fourier transform of the current signal and/or by taking the Fourier transform of the autocorrelation function of the current signal.

According to an embodiment, the control circuitry is configured to determine, based on the determined periodicity of the current signal, at least one of a rotational speed of the electric motor during at least a part of the lubrication action, a rotational speed of the rotatable shaft of the container during at least a part of the lubrication action, and a displacement of the piston along the shaft of the container during at least a part of the lubrication action. As mentioned hereinabove, the periodicity of the current signal and/or the frequency of the current signal can be related to the rotational speed of the electric motor. The rotational speed of the electric motor, in turn, is related to the rotational speed of the rotatable shaft and the displacement of the piston along the shaft during the lubrication action. Accordingly, one or more of these quantities can be determined based on the periodicity with high accuracy and precision. Further, based on one or more of these quantities, one or more lubrication parameters can be calculated and/or computed. Accordingly, the control circuitry can be configured to determine the at least one lubrication parameter based on at least one of the determined rotational speed of the electric motor, the rotational speed of the rotatable shaft, and the displacement of the piston.

According to an embodiment, the control circuitry is configured to determine the at least one of the rotational speed of the electric motor, the rotational speed of the rotatable shaft, and the displacement of the piston, based on the determined periodicity of the acquired current signal, based on a number of brushes of the electric motor and based on a number of windings of the electric motor. In other words, the electric motor can be a brushed motor and the modulation of the current signal can be caused by current pulses that are generated when a brush passes a winding of the electric motor. Hence, based on the number of brushes and the number of windings, the number of current pulses occurring during a single rotation of the electric motor (and/or an armature thereof) can be computed, e.g. based on multiplying these two numbers. Hence the rotational speed of the electric motor, of the shaft and/or the displacement of the piston can be determined based on the periodicity and based on a motor characteristic, e.g. descriptive of the number of brushes and/or windings of the electric motor.

According to an embodiment, the control circuitry is configured to determine the at least one lubrication parameter based on at least one container parameter, wherein the at least one container parameter is indicative of at least one of a type of the lubricant container, a capacity of the lubricant container, a volume of the lubricant container, an initial volume of lubricant stored in the lubricant container, a geometry of the lubricant container, a height of the lubricant container, and a diameter of at least a part of the lubricant container. By way of example, based on the at least one container parameter and based on a displacement of piston during the lubrication action as determined based on the periodicity, the amount dispensed during the lubrication action can be calculated. Further, taking into account an initial volume of lubricant in a container and the actual amount dispensed from said container during the lubrication action (or an accumulated amount of lubricant dispensed during a plurality of lubrication actions), the amount of lubricant remaining in the container after performing the lubrication action can be calculated.

Therein, the at least one container parameter may be stored in a data storage of the lubricator. Alternatively or additionally the at least container parameter may be retrieved from another source, e.g. via a communication circuitry of the lubricator.

According to an embodiment, the at least one lubrication parameter is indicative of the amount of lubricant dispensed during the at least one lubrication action, wherein the control circuitry is configured to compare the determined amount of lubricant dispensed during the at least one lubrication action with a target and/or pre-defined amount of lubricant which should be dispensed during the at least one lubrication action. Generally, this allows to ensure that the object is reliably lubricated with the correct amount of lubricant as specified by the target amount.

According to an embodiment, the control circuitry is configured to terminate the at least one lubrication action when the determined amount of lubricant dispensed reaches or exceeds the target amount of lubricant. Accordingly, the control circuitry may determine the periodicity of the current signal and determine the amount of lubricant dispensed based thereon. The amount of lubricant dispensed can then be compared to the target amount during the lubrication action. Upon reaching the target amount, the lubrication action may be stopped, thereby ensuring proper lubrication of the object.

According to an embodiment, the control circuitry is configured to determine the periodicity of the acquired current signal based on a spectral analysis of the acquired current signal. Alternatively or additionally, the control circuitry can be configured to determine a Fourier transform of the acquired current signal. Therein, the control circuitry can be configured to determine the at least one lubrication parameter based on the spectral analysis and/or based on the determined Fourier transform of the current signal.

According to an embodiment, the control circuitry is configured to determine the at least one lubrication parameter based on at least one of a frequency of a main peak (and/or a main frequency), an amplitude of the main peak, a width of the main peak (e.g. a full width at half maximum), a shape of the main peak, a frequency of at least one harmonic, an amplitude of the at least one harmonic, a width of the at least one harmonic (e.g. a full width at half maximum), a shape of the at least one harmonic, a frequency distance between the main peak and the at least one harmonic, and an amplitude difference between the main peak and the at least one harmonic of the Fourier transform of the current signal. All these features of the determined Fourier transform can be used to determine one or more lubrication parameters.

For example, the lubrication parameter "blockage of the output of the container", can be detected reliably based on one or more of the above described features of the Fourier transform, as exemplary described in the following. Based on acquiring and/or monitoring the current signal, the periodicity can be determined, which in turn is related to the rotating speed of the electric motor. When the load on the electric motor increases due to a blockage of the output, the rotating speed of the electric motor decreases and the Fourier transform and/or Fourier spectrum of current signal changes and/or is distorted with respect to operation of the lubricator without blockage of the output. Particularly, a frequency of the main peak may decrease, and the frequency of one or more harmonics may change. Even further, a level and/or amplitude of the main peak and/or of one or more harmonics may change, which may indicate that the output is blocked. Accordingly, the blockage of the output may be reliably detected based on comparing the amplitude of the main peak with an amplitude of at least one harmonic. Further, at some level of load on the electric motor, the amplitude of one or more harmonics may even surpass the amplitude of the main peak. Accordingly, the blockage of the output may be reliably detected based on determining that the amplitude of at least one harmonic reaches and/or exceeds the amplitude of the main peak of the Fourier transform of the current signal.

According to an embodiment, the control circuitry is further configured to determine a deviation of the Fourier transform of the current signal with respect to at least one reference value indicative of a reference current spectrum. The reference current spectrum may e.g. refer to a reference Fourier transform of a reference current signal. Therein, the control circuitry is configured to determine the at least one lubrication parameter based on the determined deviation. The reference current spectrum may e.g. refer to and/or be descriptive of a normal working condition of the lubricator and/or the container. Based on determining the deviation of an actual Fourier transform with respect to one or more reference values describing the reference current spectrum, one or more lubrication parameters, e.g. a blockage of an output, can be determined. Therein, the at least one reference value indicative of the reference current spectrum may e.g. refer to a frequency of the main peak, an amplitude of the main peak and/or any other feature or component of the reference current spectrum.

According to an embodiment, the at least one reference value of the reference current spectrum comprises at least one of a reference frequency of a main peak of the reference current spectrum, a reference amplitude of the main peak, a reference width of the main peak (e.g. a full width at half maximum, FWHM), a reference shape of the main peak, a reference frequency of at least one harmonic, a reference amplitude of the at least one harmonic, a reference width of the at least one harmonic (e.g. FWHM), a reference shape of at least one harmonic, a reference frequency distance between the main peak and the at least one harmonic, and a reference amplitude difference between the main peak and the at least one harmonic. Any one or more of these reference values may be used to determine one or more lubrication parameters. Further, the one or more reference values may be stored in the data storage of the lubricator. Alternatively or additionally, the one or more reference values may be retrieved from another source, e.g. via a communication circuitry of the lubricator.

According to an embodiment, the control circuitry is configured to determine, based on the Fourier transform of the current signal, at least one of a rotational speed of the electric motor during at least a part of the lubrication action, a rotational speed of the rotatable shaft of the container during at least a part of the lubrication action, and a displacement of the piston along the shaft of the container during at least a part of the lubrication action. Based on one or more of these quantities, one or more lubrication parameters can be calculated and/or computed. Accordingly, the control circuitry can be configured to determine the at least one lubrication parameter based on at least one of the determined rotational speed of the electric motor, the rotational speed of the rotatable shaft, and the displacement of the piston.

According to an embodiment, the control circuitry is configured to determine the periodicity of the acquired current signal based on an autocorrelation (and/or an autocovariance) of the acquired current signal and/or based on determining an autocorrelation function (and/or an autocovariance) of the acquired current signal. Therein, the control circuitry is configured to determine the at least one lubrication parameter based on the autocorrelation, based on the determined autocorrelation function (and/or based on the autocovariance) of the current signal.

According to an embodiment, the control circuitry is configured to determine the at least one lubrication parameter based on at least one of a local maximum, an amplitude of at least one local maximum, a width of at least one local maximum (e.g. FWHM), a shape of at least one local maximum, a position of at least one local maximum, a distance in time between at least two local maximums, and an amplitude difference between at least two local maximums of the autocorrelation function of the current signal. All these features of the determined autocorrelation function of the current signal can be used to determine one or more lubrication parameters. Likewise, the autocovariance may be used.

For example, the lubrication parameter "blockage of the output of the container", can be detected reliably based on one or more of the above described features of the autocorrelation function (and/or autocovariance), as exemplary described in the following. Based on acquiring and/or monitoring the current signal, the periodicity can be determined, which in turn is related to the rotating speed of the electric motor. When the load on the electric motor increases due to a blockage of the output, the rotating speed of the electric motor decreases and the autocorrelation function (and/or autocovariance) of the current signal changes. For instance, one or more local maximums of the autocorrelation function (and/or autocovariance), e.g. their position, shape, amplitude and/or width, depend on the rotational speed of the motor and on the load of the motor. Under normal working conditions, i.e. without blockage, the autocorrelation function (and/or autocovariance) may have one or more local maximums at known and/or fixed distance from each other. As the load increases, the autocorrelation function changes. For instance, the position, shape, width and/or amplitude of one or more local maximums can change. Further, the distance in time between at least two local maximums and/or an amplitude difference between at least two local maximums can change. By detecting one or more of these changes based on the autocorrelation function (and/or autocovariance), the blockage of the output can be reliably and accurately determined.

According to an embodiment, the control circuitry is further configured to determine a deviation of the autocorrelation function of the current signal with respect to at least one reference value indicative of a reference autocorrelation function, wherein the control circuitry is configured to determine the at least one lubrication parameter based on the determined deviation. The reference autocorrelation function may e.g. refer to an autocorrelation function of a reference current signal. The reference current spectrum may e.g. refer to and/or be descriptive of a normal working condition of the lubricator and/or the container. Based on determining the deviation of an actual autocorrelation function with respect to one or more reference values describing the reference autocorrelation function, one or more lubrication parameters, e.g. a blockage of an output, can be determined.

According to an embodiment, the at least one reference value of the reference autocorrelation function comprises at least one of a reference amplitude of at least one local maximum, a reference width of at least one local maximum (e.g. FWHM), a reference shape of at least one local maximum, a reference position of at least one local maximum, a reference distance in time between at least two local maximums, and a reference amplitude difference between at least two local maximums. Any one or more of these reference values may be used to determine one or more lubrication parameters. Further, the one or more reference values may be stored in the data storage of the lubricator. Alternatively or additionally, the one or more reference values may be retrieved from another source, e.g. via a communication circuitry of the lubricator.

According to an embodiment, the control circuitry is configured to determine, based on the autocorrelation function of the current signal, at least one of a rotational speed of the electric motor during at least a part of the lubrication action, a rotational speed of the rotatable shaft of the container during at least a part of the lubrication action, and a displacement of the piston along the shaft of the container during at least a part of the lubrication action. Based on one or more of these quantities, one or more lubrication parameters can be calculated and/or computed. Accordingly, the control circuitry can be configured to determine the at least one lubrication parameter based on at least one of the determined rotational speed of the electric motor, the rotational speed of the rotatable shaft, and the displacement of the piston.

According to an embodiment, the control circuitry is further configured to compare the at least one lubrication parameter with at least one threshold value for the lubrication parameter. The at least one threshold value may e.g. be stored in the data storage. Alternatively or additionally, the at least one threshold value may be retrieved from another source, e.g. via a communication circuitry of the lubricator.

By way of example, the at least one lubrication parameter may be an amount of lubricant dispensed during the lubrication action and a reference value, e.g. a target amount of lubricant, that should be dispensed may be compared therewith. The control circuitry may then extend the lubrication time period until the actually dispensed amount of lubricant reaches or exceeds the target amount. This can ensure proper lubrication of the object, while reducing maintenance efforts and costs.

According to an embodiment, the lubricator further comprises a communication circuitry configured to transmit a signal related to and/or indicative of the at least one lubrication parameter. The communication circuitry may be a wired communication circuitry or a wireless communication circuitry.

By way of example, the signal may be a warning signal indicating a blockage of the output of the container. Alternatively or additionally, the signal may be indicative of the amount of lubricant dispensed during the lubrication action. Alternatively or additionally, the signal may be indicative of the amount of lubricant remaining in the container after the lubrication action. Optionally, such signal may be a warning signal indicating that the remaining lubricant has reached a threshold value. This may allow to indicate that the container should be replaced.

According to an embodiment, the control circuitry is further configured to compare the at least one lubrication parameter with at least one threshold value for the lubrication parameter, wherein the control circuitry is configured to trigger transmission of the signal via the communication circuitry, when the at least one lubrication parameter reaches or exceeds the at least one threshold value for the lubrication parameter.

By means of the communication circuitry, an enhanced functionality of the lubricator can be provided. For instance, this provides the possibility of setting one or more parameters of the lubricator and reading one or more sets of data without necessity of dismounting the lubricator from the lubrication site and even without coming too close to this site, as in many cases the automatic lubricators are placed in a places with difficult or dangerous access. In such situation the communication circuitry, particularly providing wireless connectivity to the lubricator, can be advantageous as it can allow to reduce the number of LEDS, displays, switches and buttons mounted on the hardware, and in such a way decrease the cost while improving readability of data exchanged with the lubricator. For instance, the lubricator and/or the communication circuitry can comply with at least one wireless communication standard, such as e.g. Bluetooth or Wi-Fi, so that it can be accessed with a user device like a smartphone or a laptop rather than with a dedicated hardware. Hence, the lubricator might be able to exchange data, signals and/or commands with an external device which only needs to be equipped with corresponding software. Also, this can allow to avoid additional cost connected with a dedicated device designed only for communication with the lubricator. Moreover, a wireless communication can allow for placing the lubricator in hard-to-reach destinations without necessity of providing cables to connect to the device and change settings or read the data regarding the operation of the lubricator.

The communication circuitry may be and/or comprise a radio module that can be embedded into the lubricator, e.g. so that it is protected by the housing against damage, dust and humidity. This can be of particular advantage in an environment with heavy machinery where the lubricators are normally placed.

Further, based on the communication circuitry, operation of the lubricator can be monitored, e.g. without necessity of visual inspection of the lubricator mounted on a machine. Based on the communication circuitry, a self-monitoring feature, which can e.g. verify the status of the lubricator, can be implemented. For instance, a notification, a warning, a signal, a warning signal and/or an alarm message can be transmitted via the communication circuitry and/or a corresponding communication interface that is preferably configured for wireless transmission. For instance, this can allow to recognize if the lubricator is working properly or not without visual inspection. Also, a signal regarding the status and/or the lubrication parameter can be received from the lubricator, e.g. on an external device.

The self-monitoring feature or functionality of the lubricator, which can be implemented in the control circuitry, can recognize a situation when an immediate action should be taken and e.g. send an alarm message. Optionally, a failure, e.g. by assessing that the level of the lubricant in the container is coming close to empty and/or that battery level is close to discharge, can be predicted and a warning message can be sent before the actual failure occurs. This allows a service action to be planned in advance after the warning has been received.

According to an exemplary embodiment, the control circuitry is further configured to determine, estimate, compute and/or calculate a date, time, time instant and/or time period for a next service action for servicing the lubricator or at least a part thereof. The date, time, time instant and/or time period can for example be calculated based on monitoring one or more parameters, such as e.g. an amount of lubricant in the lubricant container, and the like. Alternatively or additionally, data and/or information related to one or more lubrication actions performed by the lubricator in the past and/or scheduled in future can be taken into account. For example, it can be determined how often or frequently lubricant is dispensed, how much lubricant is dispensed in each lubrication. This can allow to estimate and/or determine a remaining working time until a next service action, e.g. for a change of the lubricant container, should be carried out. Further, based on such information, the date, time, time instant and/or time period for the next service action can be determined and/or calculated. Therein, determining the date, time, time instant and/or time period may comprise determining a maintenance date for servicing the lubricator. Further, the determined date, time, time instant, time period and/or maintenance date may be transmitted via the communication circuitry, i.e. over wired or wireless communication interface, to another device which can communicate with the lubricator, such as e.g. a gateway, a laptop, a smartphone or any other device.

Generally, this can allow to reduce the number of maintenance actions as the exact date and/or time of the next maintenance action can be determined. Prediction of dates when the service should be carried out may further allow to minimize the number of unnecessary maintenance actions and to plan the work of the service team in advance. A second aspect of the present disclosure relates the use of the lubricator, as described above and in the following, for lubricating an object.

A third aspect of the present disclosure relates to a lubrication system for lubricating an object. The lubrication system comprises a lubricant container configured to contain and/or containing a lubricant and comprising a rotatable shaft with a piston to dispense the lubricant from an output of the lubricant container. The lubrication system further comprises a housing with a coupling section coupled to the lubricant container, an electric motor configured to drive the rotatable shaft of the lubricant container and/or to displace the piston during at least one lubrication action, such that at least a part of the lubricant is dispensable from the lubricant container during the at least one lubrication action. The lubrication system further comprises a power supply configured to supply the electric motor with a supply current during the at least one lubrication action, and a control circuitry for controlling and/or actuating the electric motor. Therein, the control circuitry is configured to acquire a current signal indicative of the supply current over time during at least a part of the at least one lubrication action, determine a periodicity of the acquired current signal, and determine, based on the determined periodicity, at least one lubrication parameter indicative of the at least one lubrication action.

A fourth aspect of the present disclosure relates to a method of lubricating an object, the method comprising:
 actuating, with a control circuitry of an automatic lubricator, an electric motor of the lubricator during at least one lubrication action, e.g. thereby driving a rotatable shaft of a lubricant container and/or displacing a piston coupled to the rotatable shaft;
 supplying, with a power supply of the lubricator, the electric motor with a supply current during the at least one lubrication action;
 acquiring, with the control circuitry of the lubricator, a current signal indicative of the supply current over time during at least a part of the at least one lubrication action;
 determining, with the control circuitry, a periodicity of the acquired current signal; and determining, with the control circuitry based on the determined periodicity, at least one lubrication parameter indicative of the at least one lubrication action.

According to an embodiment, determining the periodicity of the acquired current signal comprises at least one of determining a Fourier transform of the acquired current signal, and determining an autocorrelation function of the acquired current signal. Therein, the autocorrelation function of the current signal and/or the Fourier transform of the current signal may be analyzed to determine the periodicity, presence of a periodicity, absence of a periodicity and/or the at least one lubrication parameter.

A fifth aspect of the present disclosure relates to a computer program, which, when executed by one or more processors of a lubricator, instructs the lubricator to carry out the steps of the method, as described above and in the following.

A sixth aspect of the present disclosure relates to a non-transitory computer-readable medium storing a computer program, which, when executed by one or more processors of a lubricator, instructs the lubricator to carry out the steps of the method, as described above and in the following.

It should be noted that any feature, element, step and/or function described above and in the following with reference to one aspect of the present disclosure equally applies to any other aspect of the present disclosure. Specifically, any feature, element, step, and/or function described above and in the following with respect to the lubricator equally applies to the lubrication system and/or the method, and vice versa.

Further, it should be noted that any embodiment described hereinabove with reference to one aspect of the present disclosure can be combined with any other embodiment of the same or any other aspect. This may mean that any dependent claim can depend from any of the preceding claims.

These and other aspects of the invention will be apparent from and elucidated with reference to the embodiments described hereinafter.

BRIEF DESCRIPTION OF THE DRAWINGS

In the following, the invention is described with reference to the appended figures which give background explanations and represent exemplary embodiments of the invention.

FIGS. 4A and 4B each show a current signal under abnormal conditions determined with a lubricator according to an exemplary embodiment.

FIG. 4C shows a Fourier transform of the current signal shown in FIGS. 4A and 4B as determined with a lubricator according to an exemplary embodiment.

FIG. 4D shows an autocorrelation function of the current signal shown in FIGS. 4A and 4B as determined with a lubricator according to an exemplary embodiment.

The figures are schematic only and not true to scale. In principle, identical or like parts, elements and/or steps are provided with identical or like reference symbols in the figures.

DETAILED DESCRIPTION OF EXEMPLARY EMBODIMENTS

Figure 1:
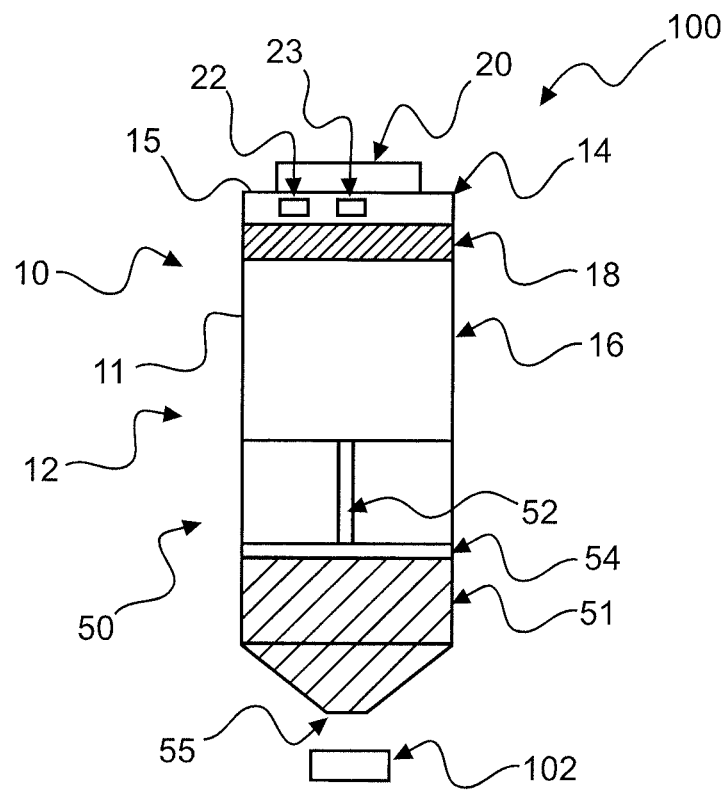
FIG. 1 shows a cross-sectional view of a lubrication system according to an exemplary embodiment.
Figure 2:
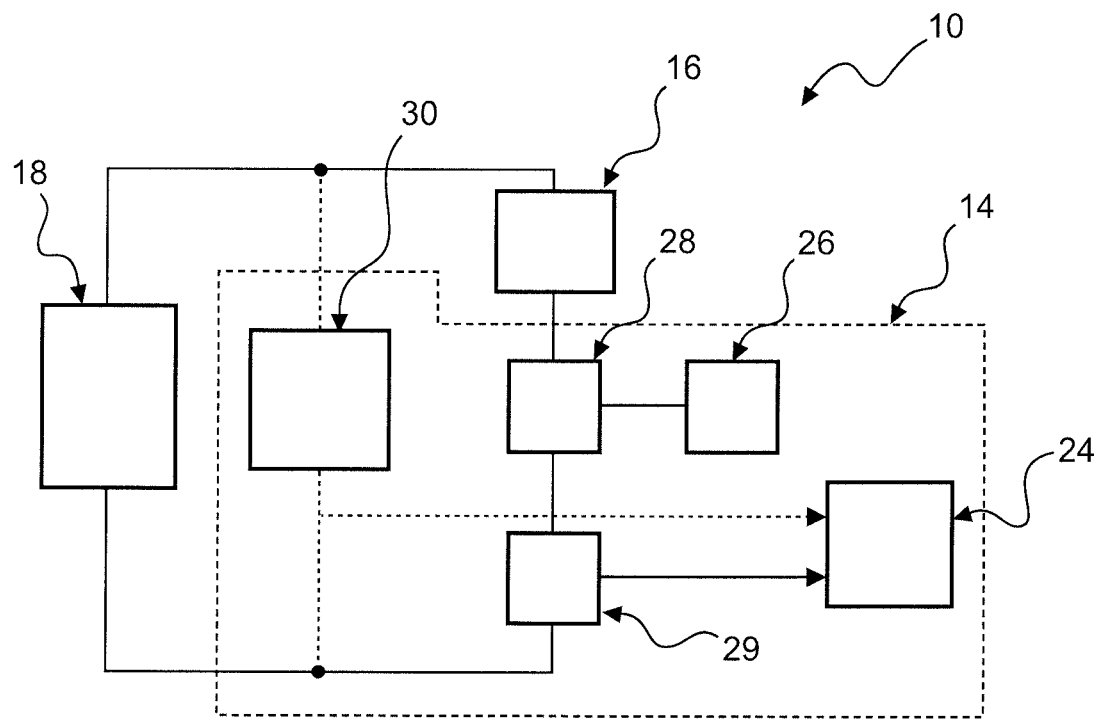
FIG. 2 shows a block diagram of a lubricator of the lubrication system of FIG. 1.

FIG. 1 shows a cross-sectional view of a lubrication system 100 according to an exemplary embodiment. FIG. 2 shows a block diagram of a part of a lubricator 10 of the lubrication system 100 of FIG. 1.

The lubrication system 100 comprises a lubricator 10 with a housing 11 having a coupling section 12 which is coupled to a lubricant container 50 of the lubrication system 100. The container 50 can be detachably attached to the lubricator 10 and/or the housing 11 by any suitable connection, such as e.g. a threaded coupling and/or threaded connection.

The lubricant container 50 comprises a rotatable shaft 52 and/or rotatable screw 52, on which a piston 54 is displaceably arranged, mounted and/or attached. Further, the container 50 contains a lubricant 51 which is to be dispensed via an outlet 55 and/or output 55 of the container 50 during a lubrication action. Upon rotation of the rotatable shaft 52, the piston 54 is displaced in a direction towards the output 55, such that a part of the lubricant 51 is pushed out of the output 55.

For driving the rotatable shaft 54 of the container 50, the lubricator 10 comprises an electric motor 16 and a control circuitry 14 for controlling and/or actuating the electric motor 16. The control circuitry 14 can be arranged at least partly on a Printed Circuit Board 15, PCB, arranged on a top side of the lubricator 10 opposite to the coupling section 12, the container 50 and/or the output 55. The PCB, however, can be arranged anywhere else. Optionally, the lubricator 10 may comprise a gearbox (not shown) which may be configured to change a rotational speed of the electric motor 11. For instance, based on the gearbox, the electric motor 11 can be operated at a low speed with higher force and at a high speed with low force.

The control circuitry 14 is further coupled to a power supply 18 which provides the electrical power, i.e. a supply voltage and a supply current, for driving the electric motor 16, the rotatable shaft 52 and/or the piston 54. The power supply 18 can comprise one or more batteries. Alternatively or additionally, the power supply 18 may be connected to a supply grid and/or a power supply system.

The lubricator 10 is configured to dispense a certain amount of lubricant 51 during a lubrication action onto and/or into an object 102 that is to be lubricated, such as e.g. a part, portion and/or member of an industrial system, an apparatus and/or device. For instance, the object 102 may be a bearing 102. Therein, the lubrication action may refer to and/or be indicative of a time period, during which the electric motor 16 is actuated and/or supplied with electrical power from the power supply 18 and/or during which the amount of lubricant 51 dispensed via container output 55 is monitored based on determining the periodicity of the current signal and/or lubrication parameters, as discussed in detail in the aforegoing summary part.

Further, the control circuitry 14 is configured to acquire, detect, determine, and/or sample a current signal 300, 400 (see FIGS. 3A, 3B, 4A, 4B) indicative of the supply current supplied by the power supply 18 to the electric motor 16 during at least a part of the lubrication action and/or during at least a part of a lubrication time period associated with the lubrication action.

Further, the control circuitry 14 may be configured to store the current signal 300, 400 and/or current data indicative thereof in a data storage 23 of the lubricator 10.

To acquire, detect, determine and/or sample the current signal 300, 400, the control circuitry 14 comprises a current sensor 29 arranged in a supply line coupling the electric motor 16 with the power supply 18, as shown in detail in FIG. 2, which shows a block diagram of the control circuitry 14, the electric motor 16 and the power supply 18.

Further, the control circuitry 14 is configured to analyze the current signal in terms of a periodicity, in terms of a presence of a periodicity and/or in terms of an absence of a periodicity, as discussed in more detail hereinabove and hereinbelow. To determine the periodicity of the current signal 300, 400, the control circuitry 14 comprises at least one processing unit 24 and/or at least one processor 24 that is configured to process the current signal 300, 400 and/or the current data.

Moreover, the control circuitry 14 and/or the at least one processor 24 is configured to determine at least one lubrication parameter based on the determined periodicity of the current signal. Generally, the lubrication parameter can be one or more of an abnormal working condition of the lubricator 10, an abnormal working condition of the lubricant container 50, a blockage of the output 55 of the lubricant container 50, a malfunction of the electric motor 16, a malfunction of the power supply 18, an amount of lubricant 51 dispensed during at least a part of the lubrication action, an accumulated amount of lubricant 51 dispensed from the lubricant container 50 in a plurality of lubrication actions, an amount of lubricant 51 remaining in the lubricant container 50, a force exerted by the electric motor 16 onto the rotatable shaft 52 of the container 50 during at least a part of the lubrication action, a load of the electric motor 16 during at least a part of the lubrication action, a lubrication time period for the lubrication action, a lubrication frequency, and a time between consecutive lubrication actions. Also other lubrication parameters can be determined, such as e.g. a normal working condition of the lubricator 10 and/or a start time for a subsequent lubrication action, as discussed in detail in the aforegoing summary part.

In order to determine the periodicity of the current signal 300, 400 and/or to determine one or more lubrication parameters, the control circuitry 14 can be configured to determine, compute and/or calculate a Fourier transform of the current signal, e.g. by means of the at least one processor 24, as will be discussed in more detail with reference to FIGS. 3C and 4C. Alternatively or additionally the control circuitry 14 can be configured to determine, compute and/or calculate an autocorrelation function of the current signal 300, 400, e.g. by means of the at least one processor 24, as will be discussed in more detail with reference to FIGS. 3D and 4D.

Moreover, the control circuitry 14 can compute one or more of the lubrication parameters based on the determined periodicity and based on at least one container parameter which may be descriptive of at least one of a type of the lubricant container 50, a capacity of the lubricant container 50, a volume of the lubricant container 50, an initial volume of lubricant stored in the lubricant container 50, a geometry of the lubricant container 50, a height of the lubricant container 50, and a diameter of at least a part of the lubricant container 50. Also the at least one container parameter can be stored in the data storage 23. Alternatively or additionally, it can be retrieved and/or accessed by the control circuitry 14 via a communication circuitry 22 of the lubricator 10.

Further, the control circuitry 14 comprises a switch control 26 and a switch 28, such as e.g. a semiconductor switch, a transistor or the like. The switch 28 can be actuated by the switch control 26 to switch the electric motor 16 on and off. The control circuitry 14 may be configured to switch-on the electric motor 16 to initiate and/or start the lubrication action, e.g. at a lubrication start time. Further, the electric motor 16 may be configured to switch-off the electric motor 16 to terminate and/or stop the lubrication action, e.g. at a lubrication stop time.

Optionally, the control circuitry 14 may comprise a voltage sensor 30 configured to detect, monitor and/or determine the supply voltage during the lubrication action. Information about the supply voltage can optionally be used for determining one or more lubrication parameters.

The communication circuitry 22 of the lubricator can be a wired communication circuitry or a wireless communication circuitry. The communication circuitry 22 can be integrated into the housing 11. Therein, the communication circuitry 22 can comprise a corresponding communication interface. Via the communication circuitry 22, a signal indicative of the at least one lubrication parameter can be transmitted. For instance, a signal or warning signal can be transmitted if a blockage of the output 55 has been detected and/or if it has been detected that the level of lubricant 51 in the container 50 has reached a certain threshold value.

The control circuitry 14 can provide a self-monitoring functionality, e.g. allowing to recognize a situation when an immediate action should be taken. Further, upon detection of such situation an alarm message and/or signal can be transmitted via the communication circuitry 22. Also, in case when the status of the lubricator 10 and/or the container 50 changes slowly and it is expected that it might be heading into a problematic situation, the lubricator 10 can predict a failure, such as e.g. assessing that the level of the lubricant in the container 50 is coming close to empty and/or that the battery level is close to discharge, and send a warning message before the actual failure occurs and bring it to the attention of an operator. This allows to plan a service action in advance after the warning has been received.

Due to the fact that the lubricators 10 are often placed in location with difficult access and it is not always possible to provide wires to them, the communication circuitry 22 used for transmission of the signal, warning signal and/or alarm message preferably is a wireless communication circuitry 22 (although not necessarily).

Also any other information, data and/or signals can be transmitted and/or received via the communication circuitry 22. For instance, such information, data and/or signals can relate to at least one parameter characterizing the power supply, at least one parameter characterizing the lubricator 10 and/or at least one parameter characterizing the object 102 and/or a machine on which the lubrication system 100 is mounted.

For example, the communication circuitry 22 can comprise a radio communication module, preferably enabling transmission over one or more wireless protocols, such as e.g. Bluetooth or Wi-Fi. This allows accessing the lubricator 10 with an external device like a smartphone or a laptop, or other external devices. Also, the communication circuitry 22 can communicate, for example, with a main MCU over HCl or UART interface, or it might be an MCU with integrated radio communication.

The lubricator 10 further comprises an indicator 20 and/or display 20 configured to display at least one information item related to the at least one lubrication parameter.

Figure 3A:
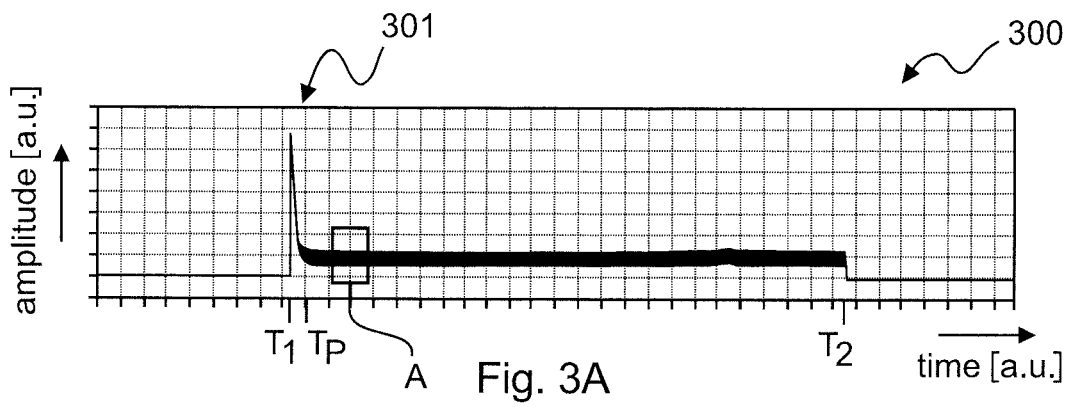
FIGS. 3A and 3B each show a typical current signal under normal working conditions determined with a lubricator according to an exemplary embodiment.
Figure 3B:
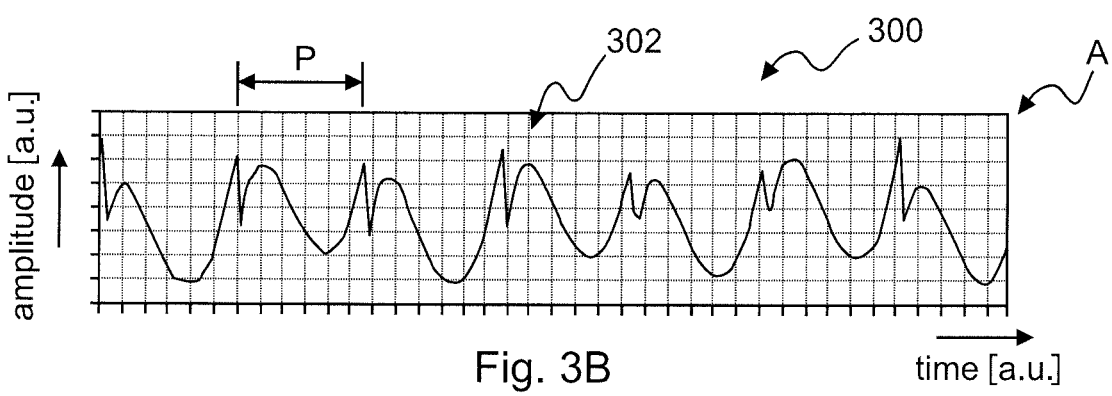

FIGS. 3A and 3B each show a current signal 300 determined with a lubricator 10 according to an exemplary embodiment. Specifically, FIGS. 3A and 3B each show an amplitude of the current signal 300 in arbitrary units as a function of time (and/or over time) in arbitrary units. Therein, FIG. 3B shows a detailed view (or zoom) of a part A of the current signal 300 of FIG. 3A. Further, the current signal 300 shown in FIGS. 3A and 3B refers to a current signal 300 acquired during a normal working condition of the lubricator 10 and/or container 50, in which e.g. the output 55 is not blocked.

As can be seen in FIG. 3A, when the lubrication action is started at the lubrication start time $T_1$, a peak 301 and/or current pulse 301 occurs as a large amount supply current is drawn by the electric motor 16 when rotation of the electric motor 16 and/or an armature thereof is started. After a short period of time, however, this peak 301 drops due to the back electromotive force generated by the rotating electric motor 16. After the peak 301 has dropped at time $T_p$, the current signal fluctuates about a mean amplitude and/or value until the lubrication action is stopped at time $T_2$.

In the example shown in FIGS. 3A and 3B, the electric motor 16 is a brushed motor 16. When a brush of the electric motor 16 passes a winding of the electric motor 16, current pulses 302 are generated. Accordingly, the current signal 300 exhibits a certain modulation with a periodicity P and/or period P which is directly related to the rotation and/or rotational speed of the electric motor 16. In turn, the rotational speed of the electric motor 16 is related to the rotational speed of the rotatable shaft 52 and/or the displacement of the piston 54 along the shaft 52 during the lubrication action.

Accordingly, the control circuitry 14 can compute the rotational speed of the motor 16, the rotational speed of the shaft 52 and/or the displacement of the piston during the lubrication action based on determining the periodicity of the current signal during at least a part of the lubrication action, e.g. between time $T_p$ and $T_2$. Further, based on one or more of these quantities, one or more lubrication parameters can be computed by the control circuitry 14.

For instance, knowing the periodicity P and the actual lubrication time since the start of the lubrication action (or at least a part thereof), it can be determined by how much the piston 54 was displaced. This allows to compute the amount of lubricant 51 dispensed during the lubrication action, e.g. based on one or more container parameters as described above. Further, based on the amount of lubricant 51 dispensed during the lubrication action, an amount of lubricant 51 remaining in the container 50 after the lubrication action can be computed. Accordingly, by determining the periodicity P of the current signal 300, one or more lubrication parameters can be reliably and accurately determined.

Further, the control circuitry 14 may be configured to compare the determined one or more lubrication parameters with one or more reference values for the one or more lubrication parameters. Such one or more reference values may be stored in the data storage 23 and/or may be retrieved via the communication circuitry 22.

This way, by determining the periodicity P, it can be ensured that the motor 16 is driven until a proper amount of lubricant is dispensed from the container 50, which could not be achieved e.g. with fixed lubrication time period. In an illustrative example, the amount of lubricant 51 dispensed during the lubrication action can be determined based on the periodicity P and compared to a target amount of lubricant which should be dispensed. The lubrication action may then be extended until the amount of lubricant 51 determined based on the periodicity P reaches and/or exceeds the target amount of lubricant. This can ensure proper lubrication of the object 102, while reducing maintenance efforts and costs.

In another illustrative example, the lubrication parameter of the amount of lubricant remaining in the lubricant container 50 can be determined based on the periodicity P. As described above, based on the periodicity P, the amount of lubricant dispensed during the lubrication action can be determined. Further, taking into account an initial amount of lubricant 51 stored in the container 50, e.g. based on a container parameter, it can be computed how much of the lubricant 51 is left in the container 50 after the lubrication action. Accordingly, based on the determined periodicity P, it can be detected and/or predicted when the lubricant container 50 is empty.

For instance, a signal and/or warning signal can be triggered by the control circuitry 14 and transmitted via the communication circuitry 22 when the remaining amount of lubricant reaches a certain threshold value. Again, this can ensure proper lubrication of the object 102, while reducing maintenance efforts and costs.

As mentioned above, the control circuitry 14 can be configured to determine the periodicity P based on a spectral analysis and/or based on an autocorrelation of the current signal 300.

Figure 3C:
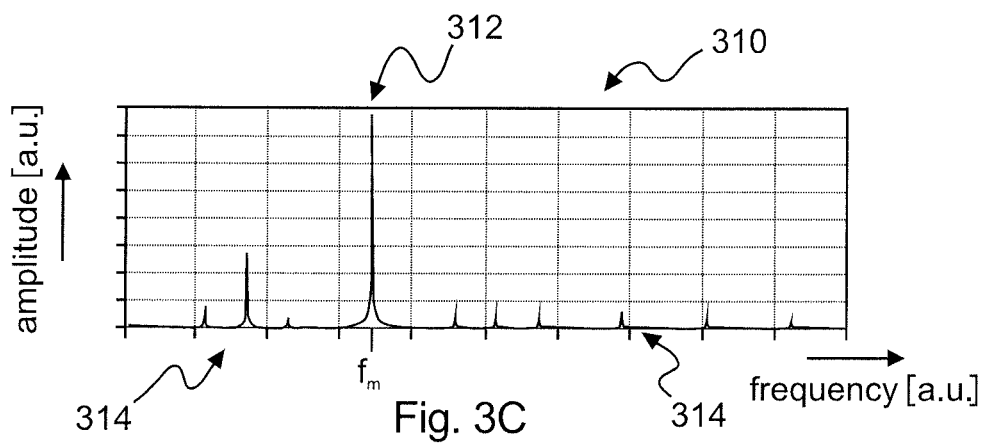
FIG. 3C shows a Fourier transform of the current signal shown in FIGS. 3A and 3B as determined with a lubricator according to an exemplary embodiment.

To illustrate this, FIG. 3C shows a Fourier transform 310 and/or Fourier spectrum 310 of the current signal 300 shown in FIGS. 3A and 3B as determined with a lubricator 10 according to an exemplary embodiment. Specifically, FIG. 3C shows the amplitude of the Fourier transform 310 in arbitrary units as a function of the frequency in arbitrary units.

As can be seen, the Fourier transform 310 comprises a main peak 312 at a frequency $f_m$ and one or more harmonics 314. During normal working condition of the lubricator 10 as illustrated in FIGS. 3A to 3C, the main peak 312 is much more pronounced than the harmonics 314, which is a result of a substantially homogenous or uniform rotation of the electric motor 16.

Therein, the frequency $f_m$ of the main peak 312 of the Fourier transform 310 resembles the periodicity P of the current signal 300 in the frequency domain. Hence, the inverse of the frequency $f_m$ of the main peak 312 is the periodicity P of the current signal. Accordingly, to determine the periodicity P, the control circuitry 14 can be configured to compute the Fourier transform 310 of the current signal 300 and identify the main peak 312 based on determining the frequency component with the highest amplitude. Further, the control circuitry 14 can compute the frequency $f_m$ of the main peak and calculate the inverse thereof to compute the periodicity P. This allows to accurately and precisely determine the periodicity P.

Figure 3D:
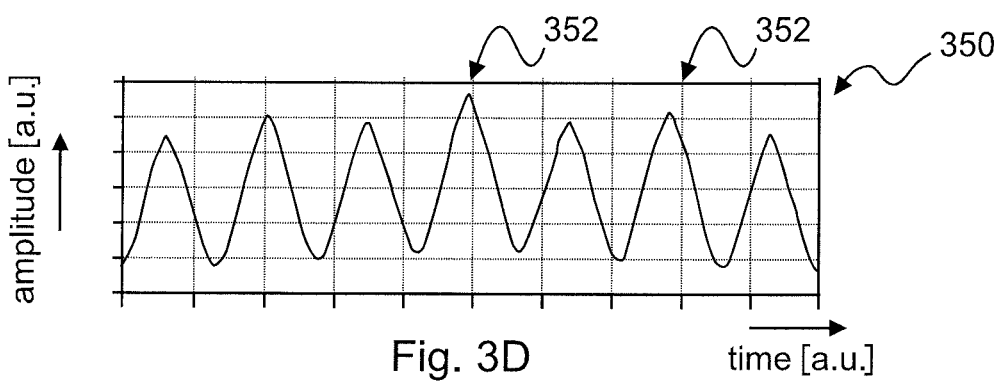
FIG. 3D shows an autocorrelation function of the current signal shown in FIGS. 3A and 3B as determined with a lubricator according to an exemplary embodiment.

Alternatively or additionally, the periodicity P can be determined based on determining an autocorrelation and/or autocorrelation function 350 of the current signal 300, as illustrated in FIG. 3D. Specifically, FIG. 3D shows an autocorrelation function 350 of the current signal 300 shown in FIGS. 3A and 3B as determined with a lubricator 10 according to an exemplary embodiment. The autocorrelation function 350 is shown in FIG. 3D as amplitude in arbitrary units over time and/or as a function of the time delay in arbitrary units.

As shown in FIG. 3D, during normal working condition, the autocorrelation function 350 comprises a plurality of local maxima 352 at a fixed distance, which results from a substantially homogenous or uniform rotation of the electric motor 16.

Based on the autocorrelation function 350 of the current signal 300, the period and/or periodicity P of the current signal 300 can be calculated. Such calculation can be based on the fact that the value of the autocorrelation function 350 for a delay t equal to the periodicity P is close to or substantially equal to the value for delay zero (R(t=P)=R(t=0)=1, with R being the value of autocorrelation function 350. Accordingly, the autocorrelation function 350 allows to determine the period and/or periodicity P of the current signal 300 in the time domain. Further, the frequency $f_m$ of the current signal 300 can then be calculated as the inverse of the periodicity P.

As mentioned above, FIGS. 3A to 3D illustrate the current signal 300, the corresponding Fourier transform 310 and the corresponding autocorrelation function 350 for a normal working condition, e.g. a condition in which the amount of lubricant 51 dispensed during the lubrication action matches and/or corresponds to a target amount of lubricant 51 that should be dispensed. Particularly, in FIGS. 3A to 3D the output 55 of the container 50 is not blocked.

To illustrate the changes in the current signal when the output 55 is blocked, FIGS. 4A and 4B show a current signal 400 with blocked output 55. Specifically, FIGS. 4A and 4B each show an amplitude of the current signal 400 in arbitrary units as a function of time (and/or over time) in arbitrary units. Therein, FIG. 4B shows a detailed view (or zoom) of a part A of the current signal 400 of FIG. 4A.

As can be seen when comparing FIGS. 3A and 3B to FIGS. 4A and 4B, when the output 55 is blocked, the current signal 400 is changed and/or distorted with respect to the current signal 300. This results in a different shape, amplitude and width of the peak 401 compared to peak 301. Also, the course of the current signal 400, its modulation as well as the periodicity P of the current pulses 402 generated during the lubrication action, e.g. between time $T_p$ and time $T_2$, are changed and/or affected. This illustrates that based on the periodicity P, the blockage of the output 55 can be determined.

Moreover, FIG. 4C illustrates the Fourier transform 410 and/or Fourier spectrum 410 of the current signal 400 of FIGS. 4A and 4B. Specifically, FIG. 4C shows the amplitude of the Fourier transform 410 in arbitrary units as a function of the frequency in arbitrary units.

When compared to Fourier transform 310 of FIG. 3C, it can be seen that the Fourier transform 410 differs and/or has changed due to the blockage of the output 55.

Particularly, the frequency $f_m$ of the main peak 412 has changed and/or decreased, and the frequency of one or more harmonics 414, 414' have changed. Even further, a level and/or amplitude of the main peak 412 and/or of one or more harmonics 414, 414' have changed. Such changes can be used to detect that the output 55 is blocked.

By way of example, the blockage of the output 55 may be reliably detected based on comparing the amplitude of the main peak 412 with an amplitude of at least one harmonic 414, 414'. Further, at some level of load on the electric motor 16, the amplitude of one or more harmonics 414' may even surpass the amplitude of the main peak 412. Accordingly, the blockage of the output 55 may be reliably detected based on determining that the amplitude of at least one harmonic 414' reaches and/or exceeds the amplitude of the main peak 412 of the Fourier transform 410 of the current signal 400.

More specifically and in an illustrative example, in FIG. 4C the frequency $f_m$ of the main peak 412 may be around 210 Hz, while in FIG. 3C it may be around 340 Hz. As under normal condition illustrated in FIGS. 3A to 3D, a maximum frequency $f_m$ for the main peak 412 can be defined and/or set, for instance to approximately 380 Hz, a frequency range where the main peak 412 is expected and/or should be looked for, can be limited and/or defined. If e.g. a peak 414', e.g. which is located above the defined and/or set maximum frequency for the main peak 412, reaches and/or surpasses the amplitude of the main peak 412, this peak 414' is expectedly one of the harmonics 414'. Hence, for detecting the blockage, for example, a frequency range and/or one or more frequency limits can be defined and/or set, wherein the frequencies in the range can be analyzed in terms of a presence and/or occurrence of the main peak 412. Absence of the main peak 412 may indicate the blockage of the output 55 of the container 50.

More generally, the control circuitry 14 can be configured to determine a deviation of the Fourier transform 410 of the current signal 400 with respect to at least one reference value indicative of a reference current spectrum, such as e.g. the Fourier spectrum 310 of FIG. 3C. By way of example, the reference value may be one or more of a reference frequency $f_m$ of a main peak 312, a reference amplitude of the main peak 312, a reference width of the main peak 3121, a reference shape of the main peak 312, a reference frequency of at least one harmonic 314, a reference amplitude of the at least one harmonic 314, a reference width of the at least one harmonic 314, a reference shape of at least one harmonic 314, a reference frequency distance between the main peak 312 and the at least one harmonic 314, and a reference amplitude difference between the main peak 312 and the at least one harmonic 314. Such reference values can be stored in the data storage and/or retrieved via the communication circuitry 22.

Comparing one or more reference values with the corresponding values in the actually determined Fourier transform 410 allows to reliably detect one or more lubrication parameters, such as e.g. the blockage of the output 55. Specifically, one or more reference values may be compared with one or more of the frequency $f_m$ of a main peak 412, an amplitude of the main peak 412, a width of the main peak 412, a shape of the main peak 412, a frequency of at least one harmonic 414, 414', an amplitude of the at least one harmonic 414, 414', a width of the at least one harmonic 414, 414', a shape of the at least one harmonic 414, 414', a frequency distance between the main peak 412 and the at least one harmonic 414, 414', and an amplitude difference between the main peak 412 and the at least one harmonic 414, 414' of the Fourier transform 410 of the current signal 400.

Analogue to the approach with the Fourier transform 410 described above, the at least one lubrication parameter, such as the output's 55 blockage, can be detected based on the autocorrelation function 450 as shown in FIG. 4D. Specifically, FIG. 4D shows the autocorrelation function 450 of the current signal 400 shown in FIGS. 4A and 4B as determined with a lubricator 10 according to an exemplary embodiment. The autocorrelation function 450 is shown in FIG. 4D as amplitude in arbitrary units over time and/or as a function of the time delay in arbitrary units.

When compared to the autocorrelation function 350 of FIG. 3D, it can be seen that autocorrelation function 450 is affected by the blockage, which results in a change of the autocorrelation function 450. For instance, the relative amplitudes of local maxima 452 and the distances in time between the local maxima 452 are changed. This can then be used to detect that the output 55 is blocked.

Similar to the Fourier transform 410 described above, also for the autocorrelation function 450 a deviation with respect to at least one reference value indicative of a reference autocorrelation function, such as e.g. autocorrelation function 350 of FIG. 3D, can be computed in order to determine one or more lubrication parameters, such as the output blockage.

By way of example, the reference value may be one or more of a reference amplitude of at least one local maximum 352, a reference width of at least one local maximum 352, a reference shape of at least one local maximum 352, a reference position of at least one local maximum 352, a reference distance in time between at least two local maximums 352, and a reference amplitude difference between at least two local maximums 352.

Based on comparing one or more reference values with the corresponding values in the actually determined autocorrelation function 450 allows to reliably detect one or more lubrication parameters, such as e.g. the blockage of the output 55. Specifically, one or more reference values may be compared with a local maximum 452, an amplitude of at least one local maximum 452, a width of at least one local maximum 452, a shape of at least one local maximum 452, a position of at least one local maximum 452, a distance in time between at least two local maximums 452, and an amplitude difference between at least two local maximums 452 of the autocorrelation function 450 of the current signal 400.

Figure 5:
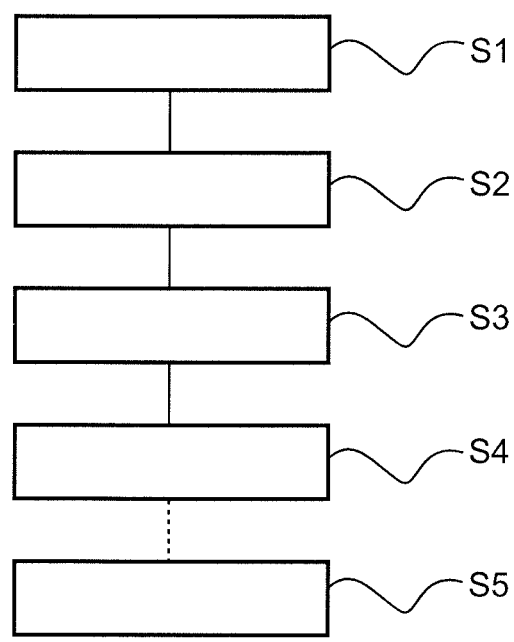
FIG. 5 shows a flowchart illustrating steps of a method of lubricating an object according to an exemplary embodiment.

FIG. 5 Shows a flowchart illustrating steps of a method of lubricating an object according to an exemplary embodiment. The method may likewise refer to a method of operating a lubricator 10 and/or a lubrication system 100 as described with reference to any of the aforegoing figures.

In step S1, the electric motor 16 of the lubricator 10 is actuated and/or switched-on with the control circuitry 14, in order to drive the rotatable shaft 52 of the lubricant container 50 and displace the piston 54 coupled to the rotatable shaft 52.

Further, step S2 comprises supplying, with the power supply 18 of the lubricator 10, the electric motor 16 with a supply current during the at least one lubrication action.

In step S2, a current signal 300, 400 indicative of the supply current over time during at least a part of the at least one lubrication is determined by the control circuitry 14.

In step S3, based on analyzing the acquired current signal 300, 400, a periodicity P of the acquired current signal 300, 400 is determined. Step S3 can comprise determining a Fourier transform 310, 410 of the acquired current signal 300, 400. Alternatively or additionally, step S3 can comprise determining an autocorrelation function 350, 450 of the acquired current signal 300, 400.

In step S4, at least one lubrication parameter indicative of the at least one lubrication action is determined by the control circuitry 14.

In an optional step S5, an information item related to the at least one lubrication action is displayed on the indicator 20 of the lubricator 10. Alternatively or additionally, a signal indicative of the at least one lubrication parameter is transmitted via the communication circuitry 22 of the lubricator 10.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. An automatic lubricator for lubricating an object, the lubricator comprising:
   a housing with a coupling section configured to couple with a lubricant container containing a lubricant, wherein the lubricant container comprises a rotatable shaft with a piston to dispense the lubricant from an output of the lubricant container;
   an electric motor configured to drive the rotatable shaft of the lubricant container such that at least a part of the lubricant is dispensable from the lubricant container;
   a power supply configured to supply the electric motor with a supply current; and
   a control circuitry for controlling the electric motor, wherein the control circuitry is configured to:
      acquire a current signal having pulses each generated by a brush of the electric motor passing a winding of the electric motor;
      determine a periodicity, of the acquired current signal, corresponding to the pulses; and
      determine, based on the determined periodicity, at least one lubrication parameter for at least one lubrication action of the automatic lubricator.

2. The lubricator according to claim 1, wherein the at least one lubrication parameter is indicative of at least one of:
   an abnormal working condition of the lubricator;
   an abnormal working condition of the lubricant container;
   a blockage of the output of the lubricant container;
   a malfunction of the electric motor;
   a malfunction of the power supply;
   an amount of lubricant dispensed during at least a part of the at least one lubrication action;
   an accumulated amount of lubricant dispensed from the lubricant container in a plurality of lubrication actions;
   an amount of lubricant remaining in the lubricant container, a force exerted by the electric motor onto the rotatable shaft of the container during at least a part of the at least one lubrication action;
   a load of the electric motor during at least a part of the at least one lubrication action;
   a lubrication time period for the at least one lubrication action;
   a lubrication frequency; and
   a time between consecutive lubrication actions.

3. The lubricator according to claim 1, wherein the control circuitry is further configured to determine, based on the determined periodicity of the current signal, at least one of:
   a rotational speed of the electric motor during at least a part of the lubrication action;
   a rotational speed of the rotatable shaft of the container during at least a part of the lubrication action; and
   a displacement of the piston along the shaft of the container during at least a part of the lubrication action.

4. The lubricator according to claim 3, wherein the control circuitry is further configured to determine the at least one of the rotational speed of the electric motor; the rotational speed of the rotatable shaft of the container; and the displacement of the piston based on the determined periodicity of the acquired current signal, based on a number of brushes of the electric motor and based on a number of windings of the electric motor.

5. The lubricator according to claim 3, wherein the control circuitry is further configured to determine the at least one lubrication parameter based on at least one of:
the rotational speed of the electric motor;
the rotational speed of the rotatable shaft; and
the displacement of the piston.

6. The lubricator according to claim 1, wherein the control circuitry is further configured to determine the periodicity of the acquired current signal based on a spectral analysis of the acquired current signal.

7. The lubricator according to claim 6, wherein the control circuitry is further configured to determine a Fourier transform of the acquired current signal, and determine the at least one lubrication parameter based on the determined Fourier transform of the acquired current signal.

8. The lubricator according to claim 7, wherein the control circuitry is further configured to determine the at least one lubrication parameter based on at least one of:
a frequency of a main peak;
an amplitude of the main peak;
a width of the main peak;
a shape of the main peak;
a frequency of at least one harmonic;
an amplitude of the at least one harmonic;
a width of the at least one harmonic;
a shape of the at least one harmonic;
a frequency distance between the main peak and the at least one harmonic; and
an amplitude difference between the main peak and the at least one harmonic of the Fourier transform of the current signal.

9. The lubricator according to claim 7, wherein the control circuitry is further configured to determine a deviation of the Fourier transform of the current signal with respect to at least one reference value indicative of a reference current spectrum, and determine the at least one lubrication parameter based on the determined deviation.

10. The lubricator according to claim 9, wherein the at least one reference value comprises at least one of:
a reference frequency of a main peak;
a reference amplitude of the main peak;
a reference width of the main peak;
a reference shape of the main peak;
a reference frequency of at least one harmonic;
a reference amplitude of the at least one harmonic;
a reference width of the at least one harmonic;
a reference shape of at the least one harmonic;
a reference frequency distance between the main peak and the at least one harmonic; and
a reference amplitude difference between the main peak and the at least one harmonic.

11. The lubricator according to claim 7, wherein the control circuitry is further configured to determine, based on the Fourier transform of the acquired current signal, at least one of:
a rotational speed of the electric motor during at least part of the at least one lubrication action;
a rotational speed of the rotatable shaft of the container during at least part of the at least one lubrication action; and
a displacement of the piston along the shaft of the container during at least apart of the at least one lubrication action.

12. The lubricator according to claim 11, wherein the control circuitry is further configured to determine the at least one lubrication parameter based on at least one of the rotational speed of the electric motor, the rotational speed of the rotatable shaft, and the displacement of the piston.

13. The lubricator according to claim 1, wherein the control circuitry is further configured to determine the periodicity of the acquired current signal based on at least one of an autocorrelation of the acquired current signal and an autocovariance of the acquired current signal.

14. The lubricator according to claim 13, wherein the control circuitry is further configured to determine an autocorrelation function of the acquired current signal, and determine the at least one lubrication parameter based on the determined autocorrelation function of the acquired current signal.

15. The lubricator according to claim 14, wherein the control circuitry is further configured to determine the at least one lubrication parameter based on at least one of:
a local maximum;
an amplitude of at least one local maximum;
a width of at least one local maximum;
a shape of at least one local maximum;
a position of at least one local maximum;
a distance in time between at least two local maximums; and
an amplitude difference between at least two local maximums of the autocorrelation function of the acquired current signal.

16. The lubricator according to claim 14, wherein the control circuitry is further configured to determine a deviation of the autocorrelation function of the acquired current signal with respect to at least one reference value indicative of a reference autocorrelation function, and determine the at least one lubrication parameter based on the determined deviation.

17. The lubricator according to claim 16, wherein the at least one reference value comprises at least one of:
a reference amplitude of at least one local maximum;
a reference width of at least one local maximum;
a reference shape of at least one local maximum;
a reference position of at least one local maximum;
a reference distance in time between at least two local maximums; and
a reference amplitude difference between at least two local maximums.

18. The lubricator according to claim 17, wherein the control circuitry is further configured to determine, based on the autocorrelation function of the acquired current signal, at least one of:
a rotational speed of the electric motor during at least part of the at least one lubrication action;
a rotational speed of the rotatable shaft of the container during at least part of the at least one lubrication action; and
a displacement of the piston along the shaft of the container during at least part of the at least one lubrication action.

19. The lubricator according to claim 17, wherein the control circuitry is further configured to determine the at least one lubrication parameter based on at least one of:
the determined rotational speed of the electric motor;
the rotational speed of the rotatable shaft; and
the displacement of the piston.

20. The lubricator according to claim 1, wherein the control circuitry is further configured to compare the at least one lubrication parameter with at least one threshold value for the at least one lubrication parameter.

21. The lubricator according to claim 1, further comprising a communication circuitry configured to transmit a signal related to the at least one lubrication parameter.

22. The lubricator according to claim 21, wherein the control circuitry is further configured to compare the at least one lubrication parameter with at least one threshold value for the at least one lubrication parameter, and trigger the transmission of the signal via the communication circuitry, in response to the at least one lubrication parameter reaching or exceeding the at least one threshold value.

23. A lubrication system for lubricating an object, the lubrication system comprising:
   a lubricant container configured to contain a lubricant and comprising a rotatable shaft with a piston to dispense the lubricant from an output of the lubricant container;
   a housing with a coupling section coupled to the lubricant container;
   an electric motor configured to drive the rotatable shaft of the lubricant container such that at least a part of the lubricant is dispensable from the lubricant container;
   a power supply configured to supply the electric motor with a supply current; and
   a control circuitry for controlling the electric motor, wherein the control circuitry is configured to:
      acquire a current signal having pulses each generated by a brush of the electric motor passing a winding of the electric motor;
      determine a periodicity, of the acquired current signal, corresponding to the pulses; and
      determine, based on the determined periodicity, at least one lubrication parameter for at least one lubrication action of lubrication system.

24. A method of lubricating an object, the method comprising:
   supplying, with a power supply, an electric motor of an automatic lubricator with a supply current;
   actuating, with a control circuitry, the electric motor;
   acquiring, with the control circuitry, a current signal having pulses each generated by a brush of the electric motor passing a winding of the electric motor;
   determining, with the control circuitry, a periodicity, of the acquired current signal, corresponding to the pulses; and
   determining, with the control circuitry, based on the determined periodicity, at least one lubrication parameter for at least one lubrication action of the automatic lubricator.

25. The method according to claim 24, wherein the determining of the periodicity comprises at least one of:
   determining a Fourier transform of the acquired current signal; and
   determining an autocorrelation function of the acquired current signal.

26. An automatic lubricator for lubricating an object, the lubricator comprising:
   a housing with a coupling section configured to couple with a lubricant container containing a lubricant, wherein the lubricant container comprises a rotatable shaft with a piston to dispense the lubricant from an output of the lubricant container;
   an electric motor configured to drive the rotatable shaft of the lubricant container during at least one lubrication action, such that at least a part of the lubricant is dispensable from the lubricant container during the at least one lubrication action;
   a power supply configured to supply the electric motor with a supply current during the at least one lubrication action; and
   a control circuitry for controlling the electric motor, wherein the control circuitry is configured to:
      acquire a current signal indicative of the supply current over time during at least a part of the at least one lubrication action;
      determine a periodicity of the acquired current signal;
      determine at least one of a rotational speed of the electric motor, a rotational speed of the rotatable shaft of the container, and a displacement of the piston, based on the determined periodicity of the acquired current signal, a number of brushes of the electric motor, and a number of windings of the electric motor; and
      determine, based on the at least one of the rotational speed of the electric motor, the rotational speed of the rotatable shaft of the container, and the displacement of the piston, at least one lubrication parameter indicative of the at least one lubrication action.

27. An automatic lubricator for lubricating an object, the lubricator comprising:
   a housing with a coupling section configured to couple with a lubricant container containing a lubricant, wherein the lubricant container comprises a rotatable shaft with a piston to dispense the lubricant from an output of the lubricant container;
   an electric motor configured to drive the rotatable shaft of the lubricant container during at least one lubrication action, such that at least a part of the lubricant is dispensable from the lubricant container during the at least one lubrication action;
   a power supply configured to supply the electric motor with a supply current during the at least one lubrication action; and
   a control circuitry for controlling the electric motor, wherein the control circuitry is configured to:
      acquire a current signal indicative of the supply current over time during at least a part of the at least one lubrication action;
      determine a Fourier transform of the acquired current signal; and
      determine, based on the determined Fourier transform, at least one lubrication parameter indicative of the at least one lubrication action.

28. A method of lubricating an object, the method comprising:
   actuating, with a control circuitry of an automatic lubricator, an electric motor of the lubricator during at least one lubrication action;
   supplying, with a power supply of the lubricator, the electric motor with a supply current during the at least one lubrication action;
   acquiring, with the control circuitry of the lubricator, a current signal indicative of the supply current over time during at least a part of the at least one lubrication action;
   determining, with the control circuitry, a periodicity of the acquired current signal;
   determining, with the control circuitry, at least one of a rotational speed of the electric motor, a rotational speed of the rotatable shaft of the container, and a displacement of the piston, based on the determined periodicity of the acquired current signal, a number of brushes of the electric motor, and a number of windings of the electric motor; and determining, with the control circuitry, based on the at least one of the rotational speed of the electric motor, the rotational speed of the rotatable shaft of the container, and the displacement of the piston, at least one lubrication parameter indicative of the at least one lubrication action.

* * * * *